3,360,462
THERMOSETTING RESIN-THERMAL ASPHALT BINDER COMPOSITION AND FIBER BOARD PRODUCED THEREFROM
Francis W. Littler, Brooklyn, N.Y., assignor to Mobil Oil Corporation, a corporation of New York
No Drawing. Filed Sept. 23, 1963, Ser. No. 310,878
14 Claims. (Cl. 260—17.2)

This invention relates to the production of improved fiberboard possessing superior strength, toughness and good water resistance.

Fiberboard materials obtained by molding and compressing wood fibers into thin, generally stiff, sheets are widely used, for example, as building materials and in the production of various protective containers and coverings. These fiberboards, however, are often not completely satisfactory for use under conditions requiring high strength combined with good water resistance. Prior efforts made to provide tough, strong fiberboard possessing good water-resistance have encountered difficulties. In general, the materials heretofore added to the board-forming compositions to impart water-resistance tend to interfere with the setting properties of the composition, thus resulting in unsatisfactory fiberboard.

It is therefore an object of the present invention to provide compositions for use in the preparation of fiberboard exhibiting improved characteristics, especially strength, toughness and good water resistance.

Another object is to provide improved fiberboard materials of this type.

Still another object is to provide a process for producing improved fiberboard materials using the aforementioned board-forming compositions.

Other objects of the invention and some advantages thereof will become apparent from the following description.

It has now been found according to the present invention that fiberboard possessing superior strength, toughness as well as water resistance can be prepared from compositions containing wood fibers and the specific combination of a thermosetting resin with a specific asphalt material.

The thermosetting resins, are, in general, synthetic resins produced by the polycondensation of formaldehyde or a formaldehyde donor with other suitable compounds. Examples of synthetic resins of this type include phenol-formaldehyde, urea-formaldehyde and melamine-formaldehyde resins. Phenol-formaldehyde resins, which are condensation products of a phenolic compound, i.e., an arylhydroxide, such as phenol, cresols, xylenols or resorcinol, with formaldehyde or a formaldehyde donor compound such as paraformaldehyde or methylene-tetramine are preferred. These phenol-formaldehyde resins are produced using a wide variety of proportions between the phenolic and formaldehyde components. Proportions in the range from about 1 to about 3 moles of formaldehyde per mole of the phenolic compound are conventional.

Phenol-formaldehyde resins of the type sold under the name Resinox 674 are particularly preferred. This particular resin is an ethanol- and acetone-soluble, one-stage phenol-formaldehyde resin, having a softening point in the range from 82° to 95° C., and possessing particles (98%) having a size up to about 200 mesh.

The specific asphalt material used in the preparation of the improved fiberboard according to the invention is a selected thermal asphalt, i.e., a heat-cracked asphalt or heat-cracked tar produced by the thermal cracking of synthetic tower bottoms obtained from a catalytic cracking unit such as a Thermofor Catalytic Cracking Unit or other aromatic gas oils. The thermal or heat-cracked asphalt employed possesses softening points (R. & B.) ° F. from about 210 to about 290, preferably from about 235 to 255 and a viscosity from about 350 centistokes (300° F.) to about 1000 centistokes (350° F.), preferably from about 400 cs. (300° F.) to 600 cs. (350° F.).

Some particular examples of asphalt compositions of this type include the following heat-cracked asphalts.

|  | (1) | (2) | (3) |
|---|---|---|---|
| Softening Point (R. & B.) ° F | 235 | 241 | 251 |
| Penetration, 100 g./5 sec.: |  |  |  |
| 150° F | 2 | 1½ | 1 |
| 160° F | 5 | 5 | 1½ |
| 170° F | 12 | 9½ | 2 |
| Solubility in Carbon Disulfide | 99.4 | ------- | 98.53 |

The wood fibers used in preparing the instant fiberboard are of the type normally employed in the preparation of fiberboard. Some examples of suitable wood fibers include those obtained from jack, southern and virginia pine, douglas balsam, western fir, cottonwood, willow, aspen, typelo and sweet gum. The fibers may be produced from the wood using a sulfite method, a grinding procedure, the asplund method or other wood defiberization processes. In general, the fibers have lengths up to about 5 mm.; while their true specific gravity runs from about 1.44 by the kerosene absorption test.

The relative proportions of the wood fibers, thermosetting resin and thermal (heat-cracked) asphalt binder will depend on various factors, such as the type of fiberboard desired, the use for which it is intended, etc.

In general, the wood fibers are present in amounts from about 60 to about 90%, preferably from about 65 to about 75%, based on the weight of the other ingredients. The thermosetting resins are used in amounts from about 5 to about 15%, preferably from about 7 to about 10%; while the thermal asphalt binder should be used in amounts from about 10 to about 25%, preferably from about 16 to about 23%.

The individual ingredients of the fiberboard-forming composition may be blended in any desired sequence. A convenient procedure is to admix the wood fibers with sufficient water (e.g., about 96–99 wt. percent of board-forming compositions) to form a slurry and then add the thermosetting resin followed by the thermal asphalt to the resulting aqueous slurry of wood fibers.

It is desirable to grind the asphalt to a finely divided form prior to its admixture with the other components.

Improved fiberboard may be produced by processing these fiberboard-forming compositions using the procedures normally employed in the production of fiberboard materials.

In general, the fiberboard-forming composition in the form of an aqueous slurry is placed in a suitable sheet mold and allowed to set. The resulting wet form is then removed from the mold and placed in a press capable of removing the excess water therefrom. After the removal of this excess water, the fiberboard is then subjected to a drying operation in an oven for a suitable period of time. After this the board is treated in a hot press maintained under elevated pressure.

The fiberboard obtained according to the present invention is a hard, waterproof board of outstanding strength and toughness. It is to be noted that the particular thermal (heat-cracked) asphalt employed is capable of imparting water-resistance to the board without detracting from its strength. This is in contrast to the waterproofing compounds heretofore used which interfere with the setting of the board-forming compositions primarily by hindering the action of the thermosetting resin, and thereby result in fiberboards lacking desirable strength and toughness.

The following specific embodiments are given to further illustrate the present invention.

*Examples 1–3*

Wood fibers produced from pine by the Asplund process, and possessing a specific gravity of about 1.44, are admixed with sufficient water to form an aqueous slurry. A phenol-formaldehyde resin (Resinox 674) is added thereto. Finally, a heat-cracked asphalt produced by the thermal cracking of the synthetic tar bottoms from a Thermofor Catalytic Cracking Unit, and possessing a softening point (R. & B.) ° F., of 250, a viscosity (at 350° F.) of 534 cs. and a penetration (100 g./5 sec.) at 150° F. of 1, which has been previously ground with water in a Waring Blendor, is added. The entire mass is agitated for about 15 minutes and then placed in an 8" x 8" sheet mold and allowed to set. The resulting wet form is then placed in a hydraulic paper press to remove the excess water. The wet board resulting from this operation is dried in an oven maintained at a temperature of about 185° F. for three hours. The dried board is then treated in a hot press at 325° F. for 6 minutes under a pressure of 500 p.s.i.g. The press is subsequently vented at 1 minute intervals until the pressure is lowered successively to 100, 80, 60, 40, and 20 p.s.i.g.

The fiberboards so obtained are measured and their water absorption, modulus of rupture and modulus of elasticity determined according to test procedures set forth in ASTM Method D–1037. As a comparison a fiberboard prepared according to the above procedure from a composition containing no heat-cracked asphalt (Example 1) is also tested.

The results are set forth in the following table.

TABLE.—FIBERBOARD TEST RESULTS

| Composition | Example 1, percent wt. | Example 2, percent wt. | Example 3, percent wt. |
| --- | --- | --- | --- |
| Thermosetting resin [1] | 10.0 | 10.0 | 10.0 |
| Thermal asphalts [2] | | 16.0 | 22.5 |
| Wood fibers [3] | 90.0 | 74.0 | 67.5 |
| | 100.0 | 100.0 | 100.0 |
| Properties of Board: | | | |
| Thickness (inches) | .146 | .131 | .125 |
| Density (lbs./cu.ft.) | 65.1 | 73.7 | 71.7 |
| Water Absorption: | | | |
| Absorption in 24 hours, wt. percent | 20.6 | 4.9 | 5.3 |
| Thickness after 24 hrs. (inches) | .168 | .135 | .131 |
| Thickness gain 24 hrs., percent | 15.0 | 3.0 | 4.8 |
| Modulus of Rupture: | | | |
| Modulus (p.s.i.) | [4] 5,000 | 12,000 | 12,900 |
| Density, lbs./cu. ft | 64.6 | 71.9 | 72.9 |
| Thickness (inches) | .140 | .127 | .123 |
| Modulus of Elasticity | | 1,375,000 | 1,413,000 |
| Appearance | ([5]) | ([6]) | ([6]) |

[1] Phenol-formaldehyde resin.
[2] Softening point (R. & B.) ° F., 250.
[3] Produced from pine wood by Asplund process.
[4] Estimated-board too flexible.
[5] Light tan.
[6] Uniform dull black.

It will be noted from the foregoing data that fiberboards of the present invention (Examples 2 and 3) exhibit superior strength and water resistance as indicated by their low-water absorption and high modulus of rupture and modulus of elasticity values. The fiberboards of the invention are seen to possess water absorption and modulus of rupture values significantly superior to fiberboard lacking the particular heat-cracked asphalt.

It will, of course, be appreciated that many modifications and variations can be practiced without departing from the scope and spirit of the present invention.

Having thus described the present invention, what I desire to secure and claim by Letters Patent is:

1. A fiberboard-forming composition containing a thermosetting resin produced by the polycondensation of a phenolic compound with a compound selected from the group consisting of formaldehyde and formaldehyde donors and a thermal asphalt binder possessing a softening point (R. & B.) from about 210 to about 290° F.

2. A composition comprising (1) a major proportion of wood fibers, (2) a thermosetting resin produced by the polycondensation of a phenolic compound with a compound selected from the group consisting of formaldehyde and formaldehyde donors and (3) a thermal asphalt binder possessing a softening point (R. & B.) from about 210 to about 290° F.

3. The composition of claim 2 wherein the wood fibers are present in an amount from about 60 to about 90% by weight.

4. The composition of claim 2 wherein the thermosetting resin is present in an amount from about 5 to about 15% by weight.

5. The composition of claim 2 wherein the thermal asphalt binder is present in an amount from about 10 to about 25% by weight.

6. The composition of claim 2 wherein the thermosetting resin is a phenol-formaldehyde resin.

7. The composition of claim 2 wherein the thermal asphalt binder possesses a softening point (R. & B.) of from about 235 to about 255° F. and a viscosity from about 400 centistokes at 300° F. to about 600 centistokes at 350° F.

8. A fiberboard containing a thermosetting resin produced by the polycondensation of a phenolic compound with a compound selected from the group consisting of formaldehyde and formaldehyde donors and a thermal asphalt binder possessing a softening point (R. & B.) from about 210 to about 290° F.

9. A fiberboard comprising (1) a major proportion of wood fibers, (2) a thermosetting resin produced by the polycondensation of a phenolic compound with a compound selected from the group consisting of formaldehyde and formaldehyde donors and (3) a thermal asphalt binder possessing a softening point (R. & B.) from about 210 to about 290° F.

10. The fiberboard of claim 9 wherein the wood fibers are present in an amount from about 60 to about 90% by weight.

11. The fiberboard of claim 9 wherein the thermosetting resin is present in an amount from about 5 to about 15% by weight.

12. The fiberboard of claim 9 wherein the thermal asphalt binder is present in an amount from about 10 to about 25% by weight.

13. The fiberboard of claim 9 wherein the thermosetting resin is a phenol-formaldehyde resin.

14. The fiberboard of claim 9 wherein the thermal asphalt binder possesses a softening point (R. & B.) of from about 235 to about 255° F. and a viscosity from about 400 centistokes at 300° F. to about 600 centistokes at 350° F.

References Cited

UNITED STATES PATENTS

| | | | |
| --- | --- | --- | --- |
| 2,409,258 | 10/1946 | Davis | 260—28 |
| 2,962,459 | 11/1960 | Ash et al. | 260—17.2 |
| 3,053,714 | 9/1962 | Edwards | 260—28 |
| 3,189,572 | 6/1965 | Cramp | 260—28 |
| 2,626,872 | 1/1953 | Miscall | 106—202 |
| 3,287,296 | 11/1966 | Wittner | 260—28 |

FOREIGN PATENTS 653,374  5/1951  Great Britain.

WILLIAM H. SHORT, *Primary Examiner.*

E. M. WOODBERRY, *Assistant Examiner.*